J. W. COTTRELL.
TRACTION WHEEL.
APPLICATION FILED MAR. 29, 1921.

1,383,078.

Patented June 28, 1921.
2 SHEETS—SHEET 1.

INVENTOR
JAMES W. COTTRELL
BY HIS ATTORNEY
Harry L. Smith

J. W. COTTRELL.
TRACTION WHEEL.
APPLICATION FILED MAR. 29, 1921.

1,383,078.

Patented June 28, 1921.
2 SHEETS—SHEET 2.

INVENTOR
JAMES W. COTTRELL
BY HIS ATTORNEY
Harry L. Smith

UNITED STATES PATENT OFFICE.

JAMES W. COTTRELL, OF HAMMONTON, NEW JERSEY.

TRACTION-WHEEL.

1,383,078.  Specification of Letters Patent.  Patented June 28, 1921.

Application filed March 29, 1921. Serial No. 456,712.

*To all whom it may concern:*

Be it known that I, JAMES W. COTTRELL, a citizen of the United States, residing in Hammonton, New Jersey, have invented certain Improvements in Traction-Wheels, of which the following is a specification.

My invention relates to traction wheels such as are used on tractors, road engines, and the like. The conventional practice is to equip the treads of such wheels with transverse cleats which aid in the tractive effort, the type of cleat varying to accord with the nature of the soil or ground over which the vehicle is to pass, and the character of the work which it is to do.

The object of my invention is to provide traction wheels of the character specified with universal cleats which will prove equally efficacious under all different conditions, and this object I accomplish in the manner hereinafter set forth, reference being had to the accompanying drawings, in which—

Figure 1:
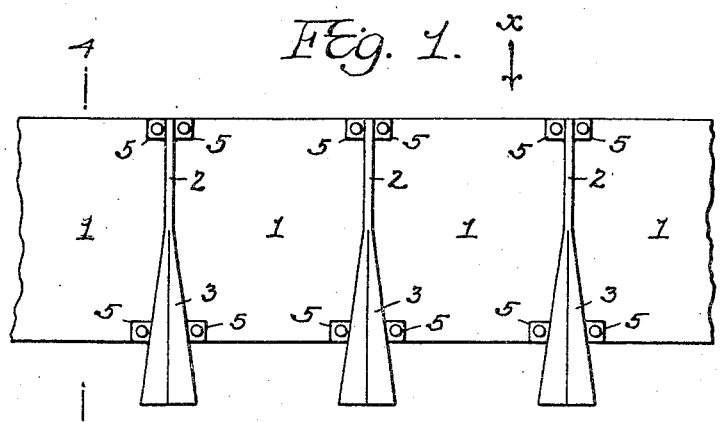
Figure 1 is a plan view, in flat projection, of a portion of the tread of a traction wheel equipped with cleats constructed in accordance with my invention.

Although my invention is not limited to any specific use I will, for the purpose of illustration, describe it in connection with a farm tractor such as is used for hauling gang plows and other agricultural implements. Where such a tractor is to be used over relatively hard or stony ground it is the conventional practice to equip the tread of the traction wheels with cleats which project outwardly therefrom and are relatively narrow and substantially parallel sided. Such cleats are in the nature of blades and it is their function to cut into the hard or stony soil, thereby increasing the tractive effort of the traction wheel. On the other hand, where the tractor is to be driven over loose, soft or sandy soil it is the conventional practice to equip the traction wheels with cleats which not only aid the tractive effort but also help to support the wheels upon the surface of the soil. Cleats of this type are substantially wedge shaped in cross section, that is to say, broad at the base and projecting outwardly to a point or apex, the degree of bluntness of the wedge being determined by the specific nature of the soil.

The object of my invention being to provide a cleat which will be universal in its applicability I have devised a cleat which, in common with others, extends transversely across the tread of the traction wheel but which, throughout a portion of its length, partakes of the nature of the cleat first described in the preceding paragraph and throughout the remainder of its length partakes of the nature of the other cleat therein described. This cleat may traverse the width of the tread of the wheel or it may extend, laterally, therebeyond, as desired.

Referring in the first instance to Figs. 1 to 4 of the drawing, I show a portion of the tread 1 of a traction wheel which is equipped with a series of transverse cleats, each comprising throughout a portion of its length a section 2 which is relatively narrow and substantially parallel sided. The remaining section 3 of each cleat is wedge-shaped in cross section, its sides tapering toward one another from the base of the cleat to its apex.

Figure 2:
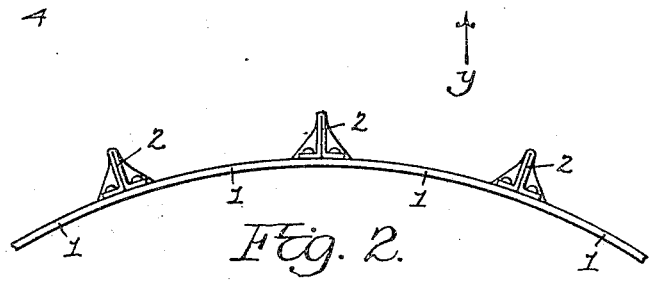
Fig. 2 is a side view of the same looking in the direction of the arrow $x$, Fig. 1.
Figure 3:
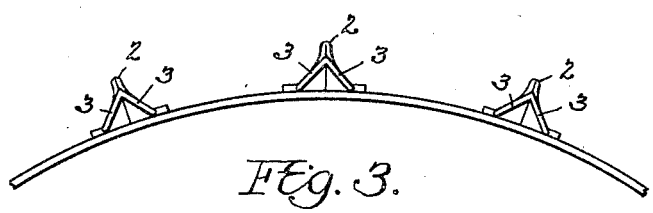
Fig. 3 is an opposite side view thereof looking in the direction of the arrow, $y$, Fig. 1.
Figure 4:
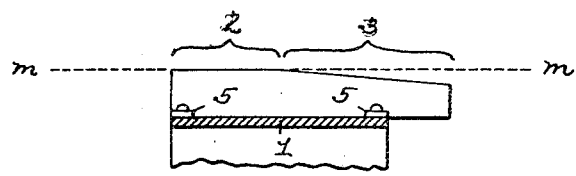
Fig. 4 is a transverse sectional view on the line 4—4, Fig. 1.

In the construction illustrated in these views, the degree of bluntness of the wedge shaped section increases as the distance from the junction point between the sections 2 and 3 increases, and its degree of projection from the tread 1 of the wheel correspondingly decreases, as is best shown in Fig. 4, wherein the line $m$—$m$ indicates the degree of projection of the section 2. Such a cleat may be readily formed from a strip of angle iron, as is best shown in Figs. 2 and 3, the two wings of the strip being positioned together throughout the section 2 of the cleat and being progressively spread apart throughout the section 3. This progressive spreading apart of the wings of the angle iron insures the progressive increase in bluntness of the section 3 and also its progressive decrease in projection. A cleat so constructed may be secured to the tread of a traction wheel in any suitable manner, such, for instance, as by providing the cleat with lugs or ears 5 which are bolted or otherwise secured to the tread 1 of the wheel.

Figure 5:
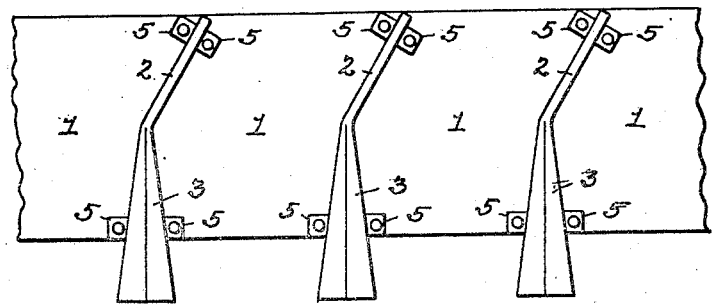
Fig. 5 is a view similar to Fig. 1 but illustrating cleats of a modified type.

In Fig. 5 is illustrated a modification of the cleat especially adapted for hillside work wherein there is danger of side slip on the part of the tractor. The cleat illustrated in this view is the same as that previously illustrated and described, with the exception that the section 2, relatively narrow and substantially parallel sided, is disposed obliquely upon the tread of the wheel. This construction, as is readily understandable, enables this portion of the cleat to exert side bearing as well as fore and aft.

Figure 6:
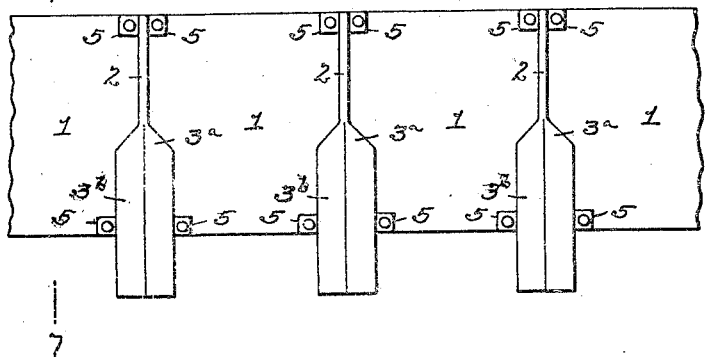
Fig. 6 is a view similar to Figs. 1 and 5 but illustrating cleats of yet another type.
Figure 7:
Fig. 7 is a transverse sectional view on the line 7—7, Fig. 6.

In certain cases it might be desired to provide a cleat the wedge shaped section of which would be substantially similar in cross section throughout, and the manner in which this may be accomplished is illustrated in Figs. 6 and 7. In these views is illustrated a cleat which comprises a relatively narrow and substantially parallel sided section 2 at one end, a short intermediate section 3ª wherein the transition in character of the cleat takes place, and a section 3ᵇ at the opposite end wherein the wedge-like cross section is substantially the same from end to end. The degree of projection of this section 3ᵇ from the tread 1 of the traction wheel is also uniform from end to end, as is shown in Fig. 7, wherein the line m—m, again indicates the degree of projection of the section 2 of the cleat.

In operation, where the tractor is being used on relatively hard or stony ground the section 2 of the cleat will cut into the ground to a considerable extent before its further penetration is resisted by the impact of the wedge-shaped section 3 or 3ᵇ, as the case may be, upon the soil. The desired aid to the tractive effort of the wheel is thereby assured. When the tractor is being operated in relatively soft, loose or sandy soil the effect of the penetration of the section 2 of a cleat is virtually *nil*, the aid to tractive effort not being effective until the wedge-shaped section 3 or 3ᵇ of the cleat penetrates the soil. Inasmuch as the character of the section 2 is what it is it cuts freely into the soft, loose or sandy soil, thereby not impeding the action of the wedge-shaped section of the cleat.

Other modifications in the design and construction of the cleat may easily be effected without departure from the essential spirit of my invention. Such will readily suggest themselves to those skilled in the art, and hence require no special illustration or description.

I claim:

1. A traction wheel, the tread of which is equipped with transverse cleats each comprising a section which is relatively narrow and substantially parallel sided and a section which is relatively wider and wedge-shaped in cross section.

2. A traction wheel, the tread of which is equipped with transverse cleats each comprising a section which is relatively narrow and substantially parallel sided and a section which is relatively wider and wedge-shaped in cross section, said latter section being progressively blunter from its point of junction with said former section to its end.

3. A traction wheel, the tread of which is equipped with transverse cleats each comprising a section which is relatively narrow and substantially parallel sided and a section which is relatively wider and wedge-shaped in cross section, said latter section being of progressively less projection from its point of junction with said former section to its end.

4. A traction wheel, the tread of which is equipped with transverse cleats each comprising a section which is relatively narrow and substantially parallel sided and a section which is relatively wider and wedge-shaped in cross section, said latter section being both progressively blunter and of progressively less projection from its point of junction with said former section to its end.

5. A traction wheel, the tread of which is equipped with transverse cleats each comprising a section which is relatively narrow and substantially parallel sided and a section which is relatively wider and wedge-shaped in cross section, said sections being disposed, axially, at an angle to one another.

6. A traction wheel, the tread of which is equipped with transverse cleats each consisting of a strip of angle iron, the wings of a section of which are positioned together while the wings of the remainder are spread apart.

7. A traction wheel, the tread of which is equipped with transverse cleats each consisting of a strip of angle iron, the wings of a section of which are positioned together while the wings of the remainder are spread apart, the degree of spread progressively increasing from the point of junction between the sections to the end of said latter section.

8. A traction wheel, the tread of which is equipped with transverse cleats each consisting of a strip of angle iron, the wings of a section of which are positioned together while the wings of the remainder are spread apart, said sections being disposed, axially, at an angle to one another.

In testimony whereof, I have signed my name to this specification.

JAMES W. COTTRELL.